United States Patent Office 2,941,864
Patented June 21, 1960

2,941,864

PREPARATION OF PHOSPHORUS OXYHALO-
BROMIDES

Arthur A. Asadorian, Midland, and George A. Burk,
Bay City, Mich., assignors to The Dow Chemical Com-
pany, Midland, Mich., a corporation of Delaware No Drawing. Filed June 16, 1958, Ser. No. 741,989

8 Claims. (Cl. 23—203)

This invention relates to the preparation of phosphorus oxyhalobromides and more particularly to the preparation of phosphorus oxybromide and phosphorus oxychlorobromides by hydrobromination of phosphorus oxychloride.

The phosphorus oxyhalides are becoming of increased importance as the demand for these compounds increase. At present relatively large quantities of phosphorus oxychloride are being made. Periodically the demand for phosphorus oxybromide exceeds its supply and a convenient and economical method of converting phosphorus oxychloride to the bromide is greatly desired. It would enable the present manufacturers of phosphorus oxychloride to convert a part of their product to the phosphorus oxybromide or phosphorus oxychlorobromides whenever there is a demand.

It is therefore a principal object of this invention to provide a process for converting phosphorus oxychloride to phosphorus oxybromide. A further object is to provide a process for the preparation of phosphorus oxychlorobromides from phosphorus oxychloride.

According to the invention, the above and other objects are attained by hydrobromination of phosphorus oxychloride in the presence of an aluminum halide catalyst, such as aluminum chloride and aluminum bromide. The process comprises intermixing the catalyst in the phosphorus oxychloride and then contacting it with gaseous hydrogen bromide. In the presence of the catalyst, the hydrogen bromide reacts rapidly with the phosphorus oxychloride substituting bromine for the chlorine in the phosphorus oxychloride to form phosphorus oxyhalobromides. Substantially complete conversion of the phosphorus oxychloride to phosphorus oxybromide may be readily obtained giving a phosphorus oxybromide product which may be used for many operations without further purification where the presence of the catalyst is not detrimental.

The term "phosphorus oxyhalobromide," as used herein, means phosphorus oxybromide, phosphorus oxydichlorobromide, and phosphorus oxychlorodibromide.

The reaction effected may be illustrated by the following equation:

$$POCl_3 + 3HBr \rightarrow POBr_3 + 3HCl$$

Theoretically, three moles of hydrogen bromide react with one mole of phosphorus oxychloride to form a mole of phosphorus oxybromide. Although the reaction is shown by one equation, it proceeds through a series of steps of first forming a phosphorus oxychlorobromide which is later further hydrobrominated to phosphorus oxybromide. These steps may be illustrated by the following equations:

$$POCl_3 + HBr \rightarrow POCl_2Br + HCl$$
$$POCl_2Br + HBr \rightarrow POClBr_2 + HCl$$
$$POClBr_2 + HBr \rightarrow POBr_3 + HCl$$

If a limited amount of hydrogen bromide is used, the phosphorus oxychloride is not completely converted to the phosphorus oxybromide and a mixture of various phosphorus oxychlorobromides such as $POCl_2Br$ and $POClBr_2$ and phosphorus oxybromide are obtained. Thus, the various oxychlorobromides may be prepared by using a limited amount of hydrogen bromide, if desired.

To obtain phosphorus oxybromide, generally a stoichometric excess of hydrogen bromide is used. The amount of excess required to insure relatively complete conversion of the phosphorus oxychloride to phosphorus oxybromide depends upon the method employed in contacting the phosphorus oxychloride liquid with the gaseous hydrogen bromide. Where the hydrogen bromide is adequately dispersed in an agitated mixture of phosphorus oxychloride, a 10 percent stoichiometric excess may be sufficient, while if the hydrogen bromide is just bubbled through a relatively unagitated reaction mixture of phosphorus oxychloride over a 100 percent stoichiometric excess may be required. In the ordinary equipment employed for liquid-gas reactions, an excess of from 25 to 50 percent of hydrogen bromide is generally sufficient.

In the reaction, the aluminum halide appears to function primarily as a catalyst, although it may undergo at least partial conversion from an aluminum salt of one halogen to an aluminum salt of another halogen, e.g. from aluminum chloride to aluminum bromide, and it may in some instances react with a portion of the phosphorus oxychloride to form a catalytically active complex compound. The aluminum halide catalyst need be employed only in a small proportion. Usually the catalyst is employed in an amount corresponding to from 0.1 to 10 mole percent of the phosphorus oxychloride reacted, with 0.5 to 2 mole percent being most often used. When the phosphorus oxybromide reaction product is to be used without further purification, an amount of catalyst, as small as 0.1 mole percent, may be used. With this small amount of catalyst the reaction rate may not be as rapid, but there is less contamination of the product with the catalyst.

While a reaction temperature from 20° C. to the boiling point of the reaction mixture may be used, it is generally preferred to use a temperature in the range of from 60° to 100° C. At temperatures below the preferred range, the reaction is not as rapid and also some crystallization of the product may be obtained. The melting point of phosphorus oxybromide is 56° C. Thus, it is desirable to operate above this temperature to maintain a liquid reaction mass without the use of a solvent.

The reaction may be simply carried out by intermixing the catalyst in the phosphorus oxychloride and then adding the required amount of hydrogen bromide to react to the mixture to form the phosphorus oxybromide or the phosphorus oxychlorobromide if desired. Either a batch or a continuous process may be employed. In a batch process a closed reactor is used and the hydrogen bromide is introduced into the phosphorus oxychloride while the mixture is being agitated. The gaseous hydrogen chloride being formed is vented from the reactor and the reaction carried out until the desired amount of hydrobromination is obtained, after which the addition of hydrogen bromide is discontinued. In a continuous operation, the phosphorus oxychloride may be introduced at the top of a tower and passed down through a bed in the tower containing the catalyst under conditions such that a liquid phase is maintained in the bed. The hydrogen bromide is introduced at the bottom of the tower and is passed up through the bed contacting the liquid flowing down. The hydrogen chloride being formed is withdrawn from the top of the tower and the phosphorus oxybromide or phosphorus oxychlorobromide from the bottom.

Although it is an advantage of the present process that the reaction may be carried out smoothly and readily without the employment of an inert liquid as a reaction medium, a solvent may be used. The reaction is usually carried out at atmospheric pressure, but it may be conducted at lower or higher pressures. No apparent advantage is gained by using a pressure greater than that necessary to vent the hydrogen chloride formed in the reaction from the reactor. Since the phosphorus oxyhalides are sensitive to water, preferably anhydrous conditions are maintained.

Upon the complete reaction of the phosphorus oxychloride with hydrogen bromide, the reaction product obtained is substantially all phosphorus oxybromide containing the catalyst and a small amount of hydrogen bromide and hydrogen chloride which may have dissolved in it. Although the reaction product of phosphorus oxybromide may be of sufficient purity for many uses, it may be further purified by the distillation of the product under vacuum to recover the pure phosphorus oxybromide. When only a partial hydrobromination of the phosphorus oxychloride is effected, the reacted mass is distilled under vacuum to recover and separate the phophorus oxybromide and the phosphorus oxychlorobromides.

The following examples further illustrate the invention but are not to be construed as limiting it thereto.

Example I

To a two liter glass flask equipped with a reflux condenser, 765 grams (5 moles) of phosphorus oxychloride were added in which 3.8 grams of aluminum chloride were intermixed. This amount of aluminum chloride represented approximately 0.5 mole percent of the phosphorus oxychloride. The phosphorus oxychloride containing the catalyst was heated to approximately 80° C. and anhydrous hydrogen bromide was bubbled into the mixture below the level of the liquid at a rate of from 2 to 4 percent per hour of the theoretical amount of hydrogen bromide required to completely react with the initial charge of phosphorus oxychloride to form the oxybromide salt. The gaseous effluent from the reactor was vented through the reflux condenser and then passed through an aqueous gas scrubber to recover the hydrogen chloride. The reaction was continued until substantially no hydrogen chloride could be detected in the gases leaving the reaction through the reflux condenser. The reaction product obtained weighed 1260 grams and upon analysis was found to contain 84 percent bromine and less than ½ weight percent of chlorine. The bromine analysis indicated that the reaction product contained over 99 percent phosphorus oxybromide. It had a melting point of approximately 54° C.

A run similar to that above was made with the exception that 0.2 mole percent of aluminum chloride was used as catalyst. The reaction product obtained contained about 82 percent bromine which indicated that the reaction product consisted approximately of 97 percent phosphorus oxybromide. It also had a melting point of around 54° C.

Example II

In a manner similar to that described above, 193 grams (1.26 moles) of phosphorus oxychloride containing 5 mole percent of aluminum chloride (8.4 grams) were contacted with anhydrous hydrogen bromide at a rate per hour equal to 10 to 15 percent of the amount of hydrogen bromide theoretically required to react with the initially charged phosphorus oxychloride. A product of 279 grams was obtained which upon analysis was found to contain 77.8 percent bromine and 4.6 percent chlorine. The product had a melting point of 49° C. Upon vacuum distillation, the product may be further purified to obtain relatively pure phosphorus oxybromide.

Example III

In a manner similar to that described in Example I, 415 gm. (2.7 moles) of phosphorus oxychloride containing 2 mole percent (8 gm.) of aluminum chloride was contacted at a temperature of 95° to 100° C. with anhydrous hydrogen bromide at a rate of 2 to 3 percent per hour of that required to react completely with the phosphorus oxychloride charged until 28 percent of the chlorine was replaced. Upon distillation of the resulting reaction product, it was found to contain approximately 40 weight percent $POCl_2Br$, trace of $POClBr_2$, and approximately 30 weight percent each of $POCl_3$ and $POBr_3$.

What is claimed is:

1. A process for the preparation of phosphorus oxyhalobromides which comprises contacting liquid phosphorus oxychloride with hydrogen bromide in the presence of an aluminum halide salt selected from the group consisting of aluminum chloride and aluminum bromide, to react the hydrogen bromide with the phosphorus oxychloride to form phosphorus oxyhalobromides, and recovering the phosphorus oxyhalobromides formed.

2. A process for the preparation of phosphorus oxyhalobromides, which comprises intermixing from 0.1 to 10 mole percent of an aluminum halide selected from the group consisting of aluminum chloride and aluminum bromide, with liquid phosphorus oxychloride, contacting the phosphorus oxychloride containing the aluminum halide with anhydrous hydrogen bromide to react the phosphorus oxychloride with hydrogen bromide to form phosphorus oxyhalobromides, and separating the phosphorus oxyhalobromides from the reacted mixture.

3. A process according to claim 2 wherein the aluminum halide is aluminum chloride.

4. A process for the preparation of phosphorus oxybromide, which comprises intermixing from 0.1 to 10 mole percent of an aluminum halide selected from the group consisting of aluminum chloride and aluminum bromide, with liquid phosphorus oxychloride, contacting the phophorus oxychloride containing the aluminum halide with a 10 to 100 percent stoichiometric excess of anhydrous hydrogen bromide at a temperature of from 20° C. to the boiling point of the reaction mixture to react the phosphorus oxychloride with the hydrogen bromide to form phosphorus oxybromide, and separating the phosphorus oxybromide from the reacted mixture.

5. A process according to claim 4 wherein the aluminum halide is aluminum chloride and the phosphorus oxychloride is contacted with a 25 to 50 percent stoichiometric excess of hydrogen bromide.

6. A process according to claim 5 wherein the metal halide intermixed with the phosphorus oxychloride is an amount of from 0.5 to 2 mole percent and the temperature is in the range of from 60° to 100° C.

7. A process for the preparation of phosphorus oxychlorobromides, which comprises intermixing from 0.1 to 10 mole percent of a metal halide selected from the group consisting of aluminum chloride, aluminum bromide, with phosphorus oxychloride, contacting the phosphorus oxychloride containing the metal halide with anhydrous hydrogen bromide at a temperature of from 20° C. to the boiling point of the reaction mixture to react the phosphorus oxychloride with the hydrogen bromide to form phosphorus oxychlorobromides, and separating the phosphorus oxychlorobromides from the reaction mixture.

8. A process according to claim 7 wherein the metal halide is aluminum chloride.

References Cited in the file of this patent

UNITED STATES PATENTS 2,591,782     Cook _____ Apr. 8, 1952

OTHER REFERENCES

Mellor: "Comprehensive Treatise on Inorganic and Theoretical Chemistry," vol. 8, 1928, page 1046.